US009972286B1

(12) United States Patent
Froment et al.

(10) Patent No.: US 9,972,286 B1
(45) Date of Patent: *May 15, 2018

(54) CONTENT ORIENTATION BASED ON A USER ORIENTATION

(71) Applicant: AMAZON TECHNOLOGIES, INC., Seattle, WA (US)

(72) Inventors: Arnaud Marie Froment, San Jose, CA (US); Kenneth Paul Kiraly, Menlo Park, CA (US); Nadim Awad, San Francisco, CA (US); Jonathan White Keljo, Seattle, WA (US); Michael David Dumont, Sunnyvale, CA (US); Levon Dolbakian, Los Gatos, CA (US); Srinivasan Sridharan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/992,697

(22) Filed: Jan. 11, 2016

Related U.S. Application Data

(63) Continuation of application No. 13/892,770, filed on May 13, 2013, now Pat. No. 9,262,999.

(51) Int. Cl.
*G09G 5/00* (2006.01)
*G09G 5/38* (2006.01)
*G06F 3/16* (2006.01)
*G06F 3/01* (2006.01)
*G06F 3/00* (2006.01)
*G06F 3/0346* (2013.01)

(52) U.S. Cl.
CPC ........... *G09G 5/38* (2013.01); *G06F 3/005* (2013.01); *G06F 3/013* (2013.01); *G06F 3/0346* (2013.01); *G06F 3/165* (2013.01); *G09G 2320/08* (2013.01); *G09G 2340/0492* (2013.01); *G09G 2354/00* (2013.01)

(58) Field of Classification Search
CPC ....... G06T 15/20; G06T 15/30; G06T 15/503; G09G 5/32; G09G 5/38
USPC .................................................. 345/649–659
See application file for complete search history.

(56) References Cited

U.S. PATENT DOCUMENTS

| 8,358,321 | B1 | 1/2013 | Weidner |
| 8,896,632 | B2 | 11/2014 | MacDougall et al. |
| 2006/0161278 | A1 | 7/2006 | Maeda et al. |
| 2008/0045279 | A1 | 2/2008 | Ohki |
| 2011/0298829 | A1 | 12/2011 | Stafford et al. |
| 2014/0286502 | A1 | 9/2014 | Chen et al. |
| 2014/0300640 | A1 | 10/2014 | Kazanjian |

OTHER PUBLICATIONS

Yang, Ryan R., "Non-Final Office Action dated May 26, 2015", U.S. Appl. No. 13/892,770, The United States Patent and Trademark Office, May 26, 2015.
Yang, Ryan R., "Notice of Allowance dated Oct. 16, 2015", U.S. Appl. No. 13/892,770, The United States Patent and Trademark Office, Oct. 16, 2015.

*Primary Examiner* — Ryan R Yang
(74) *Attorney, Agent, or Firm* — Lindauer Law, PLLC

(57) ABSTRACT

Described herein are systems, devices and methods for presenting content based on the spatial relationship between a media device and a user of the media device. The media device may present content based on an angle between an eye axis of the user and a device axis of the media device.

20 Claims, 12 Drawing Sheets

| ANGLE LIBRARY 136 | | |
|---|---|---|
| ANGLE RANGE DESCRIPTION 304 | ANGLE BETWEEN EYE AXIS AND DEVICE AXIS 306 | CONTENT ORIENTATION 114 |
| FIRST PORTRAIT ANGLE RANGE 304(1) | 45°-135° | PORTRAIT ORIENTATION 114(1) |
| FIRST LANDSCAPE ANGLE RANGE 304(2) | 136°-224° | LANDSCAPE ORIENTATION 114(2) |
| SECOND PORTRAIT ANGLE RANGE 304(3) | 225°-315° | PORTRAIT ORIENTATION 114(1) |
| SECOND LANDSCAPE ANGLE RANGE 304(4) | 316°-360°, 0°-44° | LANDSCAPE ORIENTATION 114(2) |

CONTENT ORIENTATION BASED ON A USER ORIENTATION

PRIORITY

This application claims is a continuation of, and claims priority to, pending U.S. patent application Ser. No. 13/892,770 filed on May 13, 2013, entitled "Content Orientation Based on User Orientation." The entirety of this previously filed application is hereby incorporated by reference.

BACKGROUND

Media devices such as tablets and smartphones often present content in different orientations such as portrait orientation and landscape orientation. Media devices typically automatically orient content between portrait orientation and landscape orientation based on gravity. However, this automatic orientation may result in an unpleasant user experience. For example, a user lying in bed may desire content to be displayed in a portrait orientation, while the media device is configured to present content in a landscape orientation.

Figure 1:
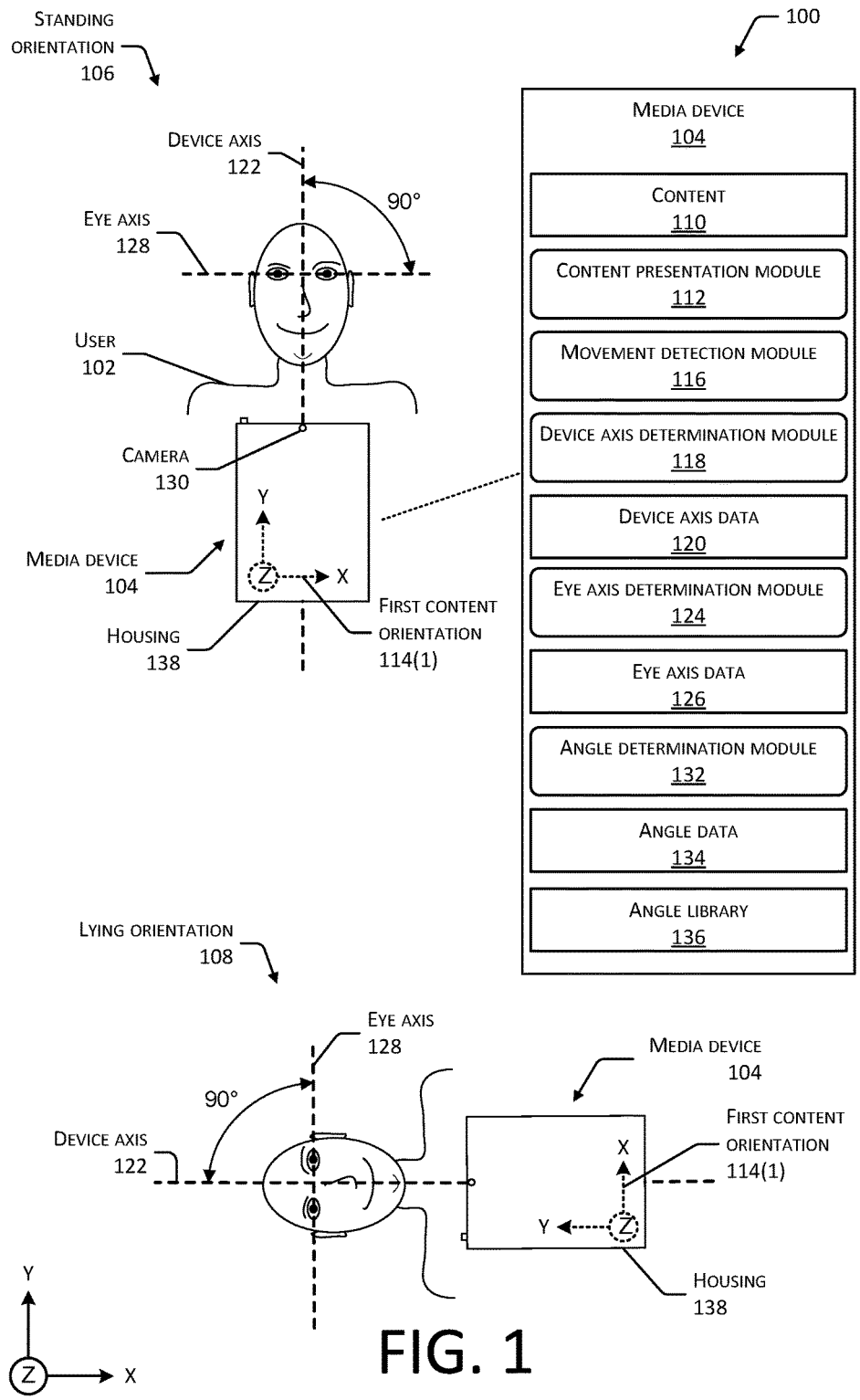
FIG. 1 is a block diagram of a system for presenting content based on an angle between an eye axis and a device axis, illustrating a user in a standing orientation and a lying orientation.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to systems and methods for presenting content based on a spatial relationship between a media device and a user of the media device. For example, as described in more detail below, the presentation may be based on the angle between the user's eye axis and the device axis of the media device.

The media device may present the content in different content orientations. For example, the media device may display the content in a portrait content orientation or a landscape content orientation. When the content is displayed in the portrait content orientation, the height of the display area of the content is greater than the width of the display area of the content. When the content is displayed in the landscape orientation, the width of the display area of the content is greater than the height of the display area of the content.

Based on the detection of at least one of a device movement of the media device or a user movement of a user associated with the media device, the media device may generate feature data representative of features of the user. The media device may generate the feature data based on image data acquired with a camera. The feature data may include data representative of the user's eyes, mouth, nose, ears, shoulders of the user, a hat worn by the user, facial hair of the user, jewelry worn by the user, or glasses worn by the user, and so forth.

Based on the feature data, the media device may generate eye axis data representative of the eye axis of the user. The eye axis of the user may be described as a line which extends from the user's first eye to the user's second eye. In one scenario, when the user is standing upright on a floor, the user's eye axis may be described as extending parallel to the floor.

Thereafter, the media device may determine an angle between the user's eye axis and the device axis of the media device. The device axis may be described as an axis of the device. In one example, the device axis is parallel to the longest dimension of the media device. The media device may include other devices to determine the device axis. For example, an accelerometer, a gyroscope, or a combination thereof may be used to determine the device axis of the media device. As discussed in more detail below, the media device may determine the angle between the user's eye axis and the device axis by determining the angle between the device axis and a geometric projection of the user's eye axis onto a plane including the device axis.

The media device may determine the angle between the user's eye axis and the device axis when the media device detects that the position or the orientation of the media device has changed. The media device may determine the angle between the user's eye axis and the device axis at predetermined time intervals.

Based on the angle between the user's eye axis and the device axis, the media device may present the content in the first content orientation (e.g., portrait content orientation) or the second orientation (e.g., landscape content orientation). In some implementations, the media device presents the content based on a previously stored angle library which associates the angle between the eye axis and the device axis with a content orientation. The angle library may include certain orientation angle ranges which are associated with certain content orientations. For example, if the angle between the eye axis and the device axis is within 45° and 135°, the media device may display the content in the portrait content orientation. Continuing the example, if the angle between the eye axis and the device axis is within 136 and 224, the media device may display the content in the landscape content orientation.

While the eye axis described above is used to determine the angle which is used to determine the content orientation, the eye axis is an axis of convenience. That is, other axes may be used. For example, an axis may be used which extends from the user's chin to the top of the user's head. Although when axes other than the eye axis are used to determine the content orientation and the relative angles may be different from the example angles illustrated herein, the resulting content orientations would be the same.

Illustrative System

FIG. 1 is a block diagram of a system 100 for presenting content based on the angle between the eye axis and the device axis. In FIG. 1, a user 102 is depicted using a media device 104 in a standing orientation 106, and in a lying orientation 108. The lying orientation 108 may be prone, supine, on one side or another, reclining, and so forth. The media device 104 depicted in FIG. 1 is oriented such that the rear view of the media device 104 is shown.

The media device 104 is configured to present, store, manipulate, or otherwise participate in the consumption of content 110. The media device 104 may include a variety of devices, such as a mobile digital device, a smartphone, a tablet computer, a desktop computer, a laptop computer, a television, an electronic book ("eBook") reader, a gaming console, a set-top box, a media player, an in-vehicle communication system, a wearable computing device and so forth. In some implementations, the media device 104 may be referred to as an information processing system or an information processing device. The media device 104 is discussed in more detail below with regard to FIG. 8.

The content 110 may include audio data, video data, electronic book data, application data, game data, and so forth. The content 110 may be downloaded or streamed from a content provider to the media device 104.

The media device 104 may include a content presentation module 112 that is configured to present the content 110 using output devices of the media device 104. For example, the presentation may include displaying the content 110 using a display device of the media device 104. The presentation may include producing audio using speakers of the media device 104. As discussed in more detail below, in FIG. 1, the content presentation module 112 may be configured to present the content 110 in one of a first content orientation 114(1) and a second content orientation 114(2) (not shown) based on positions and orientations of the user 102 and the media device 104.

As shown in FIG. 1, the content presentation module 112 presents the content 110 in the first content orientation 114(1). In this implementation, the first content orientation 114(1) may be described as a portrait content orientation. The second orientation 114(2) (shown in FIGS. 5 to 7) may be described as a landscape content orientation. When the content 110 is displayed in the portrait content orientation, the height of the display area of the content is greater than the width of the display area of the content. When the content 110 is displayed in the landscape orientation, the width of the display area of the content is greater than the height of the display area of the content.

In FIG. 1, the content orientation 114 is depicted having an X axis, a Y axis and a Z axis, which are orthogonal to one another. When the content 110 is displayed in the content orientation 114(1) depicted in FIG. 1, the content 110 is presented right-side up relative to the user 102. For example, where the content 110 includes text, the presentation of the text is presented to the user 102 such that the user 102 may read the text in its proper orientation relative to the user 102. The content orientation 114 is discussed in more detail below with regard to FIG. 2.

The media device 104 may include a movement detection module 116 configured to detect a movement of the media device 104. A movement of the media device 104 may be caused by a large variety of events. For example, with the media device 104 in hand, the user 102 may move from a standing position to a lying position. In another example, the media device 104 may fall from the hand of the user 102. The movement may be detected using one or more sensors. The sensors may include movement sensors such as an accelerometer, a gyroscope, or proximity sensors such as an optical proximity sensor, capacitive proximity sensor, or a combination thereof. The detection of the movement of the media device 104 may be based on a change in the position of the media device 104, based on a change in the orientation of the media device 104, or a combination thereof.

The media device 104 may include a device axis determination module 118 configured to generate device axis data 120 representative of a device axis 122 of the media device 104 which is indicative of a media device orientation. The orientation of the device axis 122 may be expressed relative to a spatial orientation of the media device 104. The spatial orientation is relative to a frame of reference defined by the Earth, and is described in more detail below with regard to FIG. 2. In one implementation the device axis 122 may be described as a line which is parallel to the longest dimension of the media device 104. The device axis 122 is described in more detail below with regard to FIG. 2. The generation of the device axis data 120 may be generated using other methods. For example, the generation of the device axis data 120 may be generated using one or more of an accelerometer(s), a gyroscope(s), a gravimeter(s), a tilt sensor, and so forth. The accelerometer, gyroscopes, and so forth may be used to determine the orientation of the device axis 122 of the media device 104 relative to the spatial orientation 202.

The media device 104 may include an eye axis determination module 124 configured to generate eye axis data 126 representative of an eye axis 128 of the user 102. The eye axis 128 may be described as a straight line which extends through each of the user's 102 eyes. To generate the eye axis data 126, the eye axis determination module 124 uses a camera 130 that acquires feature data. The feature data may include data representative of the user's 102 eyes, mouth, ears, nose, shoulders of the user, a hat worn by the user, facial hair of the user, jewelry worn by the user, or glasses worn by the user, and so forth. In some implementations, the feature data includes data indicative of a first eye of the user 102, and data indicative of a second eye of the user 102. The determination of the eye axis data 126 may be based on the first eye data and the second eye data. In some implementations, the determination of the eye axis data 126 may be based on other features of the user 102, for example, the user's 102 mouth, ears, nose, shoulders of the user, a hat worn by the user, facial hair of the user, jewelry worn by the user, or glasses worn by the user, and so forth.

The media device 104 may include an angle determination module 132 configured to generate angle data 134 representative of an angle between the device axis 122 and the eye axis 128. As shown in FIG. 1, in this example, the angle between the device axis 122 and the eye axis 128 is 90°.

Based on the angle between the device axis 122 and the eye axis 128, the content presentation module 112 displays the content 110 in the first content orientation 114(1) or the second content orientation 114(2). The first content orientation 114(1) may be described as the portrait content orientation, and the second content orientation may be described as the landscape content orientation. In one example, when the angle between the device axis 122 and the eye axis 128 is within 45° to 135° or 225° to 315°, the content 110 is displayed in the portrait orientation. When the angle between the device axis 122 and the eye axis 128 is within 0° to 45°, 136° to 224° or 316° to 360°, the content 110 is displayed in the landscape orientation.

In some implementations, the content presentation module 112 determines the content orientation 114 by comparing the angle between the device axis 122 and the eye axis 128 with a previously stored angle library 136 which may include angle ranges. The angle library 136 may associate particular angles with particular orientations. In this example, the angle library 136 includes a first orientation angle range of 45° to 135° which is associated with the portrait content orientation. The angle library 136 is discussed in more detail below with regard to FIGS. 3 to 5. In FIG. 1, the content presentation module 112 displays the content 110 in the portrait content orientation because the angle between the device axis 122 and the eye axis 128 (i.e., 90°) is within the first orientation angle range (i.e., 45° to 135°).

The media device 104 may include a housing 138 which may be configured to support certain components of the media device 104. Although the shape of the housing 138 depicted in FIG. 1 has a rectangular shape, the housing 138 may have other shapes, such as a square shape, a circular shape, and irregular shape, and so forth.

In FIG. 1, where the user 102 is in the lying orientation 108, the content 110 is displayed in the first content orientation 114(1) because the angle between the device axis 122 and the eye axis 128 is 90°. Such a configuration may improve the user experience by automatically displaying the content 110 in the orientation the user 102 desires based on the orientation of the user 102 and the media device 104. For example, where the user 102 is standing and reading with the media device 104, and then lies in bed to continue to read with the media device 104, the media device 104 may automatically orient the content 110 based on the user's eye axis 128 such that the user 102 may continue to read the content 110 in the proper orientation preferred by the user 102.

Figure 2:
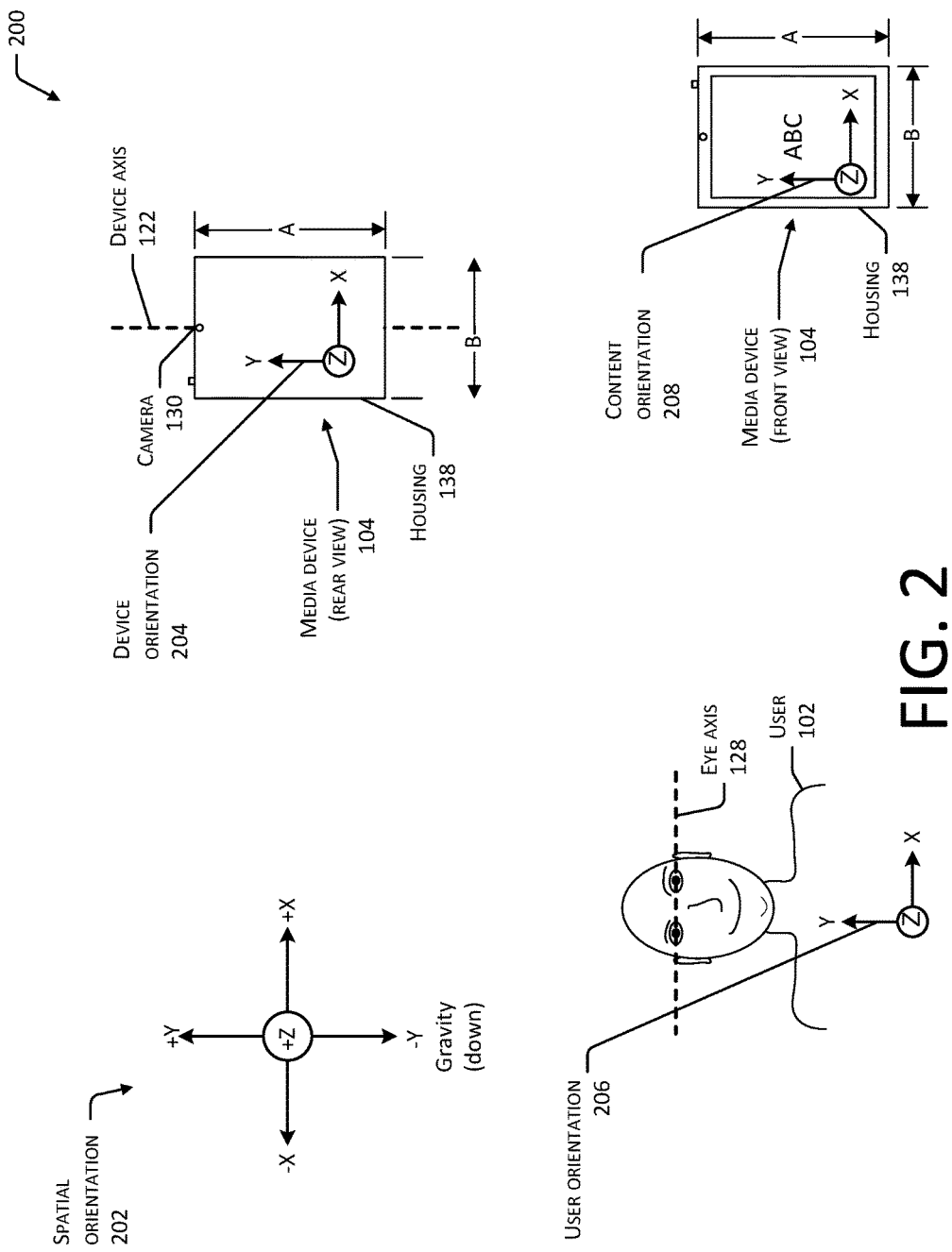
FIG. 2 is a schematic of orientations including a spatial orientation, a device orientation, a user orientation, and content orientation.

FIG. 2 is a schematic 200 of orientations and references described herein. The orientations include a spatial orientation 202, a device orientation 204, a user orientation 206 and a content orientation 208.

The spatial orientation 202 illustrates an example frame of reference relative to the Earth or another reference frame which is considered fixed and which may be used to determine positions and orientations of the user 102, the media device 104, and the content 110. As illustrated, the spatial orientation 202 includes an X axis, a Y axis and a Z axis. As shown in FIG. 2, the Y axis is oriented based on gravity. The X axis and the Z axis may be described as being perpendicular to gravity, and perpendicular to one another. The spatial orientation 202 may be described as an Earth-based coordinate system, such as north-based azimuth, where the Y axis is oriented vertically based on terrestrial gravity.

The media device 104 depicted with the device orientation 204 is oriented such that a rear view of the media device 104 is shown. The media device 104 depicted includes the following three dimensions: dimension A which extends along a longest edge of the media device 104 (such as height); dimension B which extends along a second longest edge of the media device 104 (such as width); and dimension C (not shown) which extends along a shortest edge of the media device 104 (such as thickness). The device orientation 204 includes an X axis, a Y axis and a Z axis. In this example, the Y axis is parallel with dimension A of the media device 104. The X axis is parallel with dimension B of the media device 104. The Z axis is perpendicular to the X and the Y axes, and is parallel with dimension C of the media device 104. The device axis 122 may be described as being parallel with the Y axis of the device orientation 204. The angle determination module 132 may be configured to generate the angle data 134 based on the device orientation 204. The device orientation 204 may be determined using one or more sensors. For example, the device orientation 204 may be determined using one or more of an accelerometer, a gyroscope, a gravimeter, a tilt sensor, and so forth. In some implementations, the device orientation 204 may be determined based on a system which generates an active signal, providing a fixed coordinate system. For example, a light system which generates infrared beams may be used to determine the device orientation 204.

While the media device 104 illustrated in the figures depict the media device 104 as having a rectangular shape, the media device may have any shape, such as a square shape, round shape, triangular shape, or irregular polyhedron. For example, as shown in FIG. 2, the dimension A and the dimension B may be the same length.

The user orientation 206 includes an X axis, a Y axis and a Z axis. The angle determination module 132 may be configured to generate the angle data 134 based on the user orientation 206. In this example, the eye axis 128 is parallel with the X axis of the user orientation.

The media device 104 depicted with the content orientation 208 is oriented such that the front view of the media device 104 is shown. The content orientation 208 includes an X axis, a Y axis and a Z axis. As illustrated, in this example, the Y axis is parallel with dimension A of the media device 104, the X axis is parallel with dimension B of the media device 104, and the Z axis is parallel with the C dimension of the media device 104. The upward extending Y axis may be described as being the direction in which presented content is right-side up. The angle determination module 132 may be configured to generate the angle data 134 based on the content orientation 208.

Figure 3:
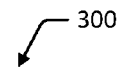
FIG. 3 illustrates an angle library comprising angle ranges which are associated with content orientations.

FIG. 3 illustrates the angle library 136. The angle library 136 associates particular angles with particular content orientations. The angle library 136 includes a plurality of angle ranges listed under the column angle range description 304. The angle library 136 also includes a list of particular angles which fall within the angle ranges under the column angle between the eye axis and the device axis 306 which are associated with content orientations 114.

A first portrait angle range 304(1) comprises the following angles between the eye axis and the device axis 306: 45° to 135°. When the angle between the eye axis and the device axis 306 is within the first portrait angle range 304(1) the angle library 136 associates said angle 306 with the portrait content orientation 114(1). A first landscape angle range 304(2) comprises the following angles between the eye axis and the device axis 306: 136° to 224°. When the angle between the eye axis and the device axis 306 is within the first landscape angle range 304(2) the angle library 136 associates said angle 306 with a landscape content orientation 114(2). A second portrait angle range 304(3) comprises the following angles between the eye axis and the device axis 306: 225° to 315°. When the angle between the eye axis and the device axis 306 is within the second portrait angle range 304(3) the angle library 136 associates said angle 306 with the portrait content orientation 114(1). A second landscape angle range 304(4) comprises the following angles between the eye axis and the device axis 306: 316° to 360° and 0° to 44°. When the angle between the eye axis and the device axis 306 is within the first portrait angle range 304(1) the angle library 136 associates said angle 306 with the landscape content orientation 114(2).

Figure 4:
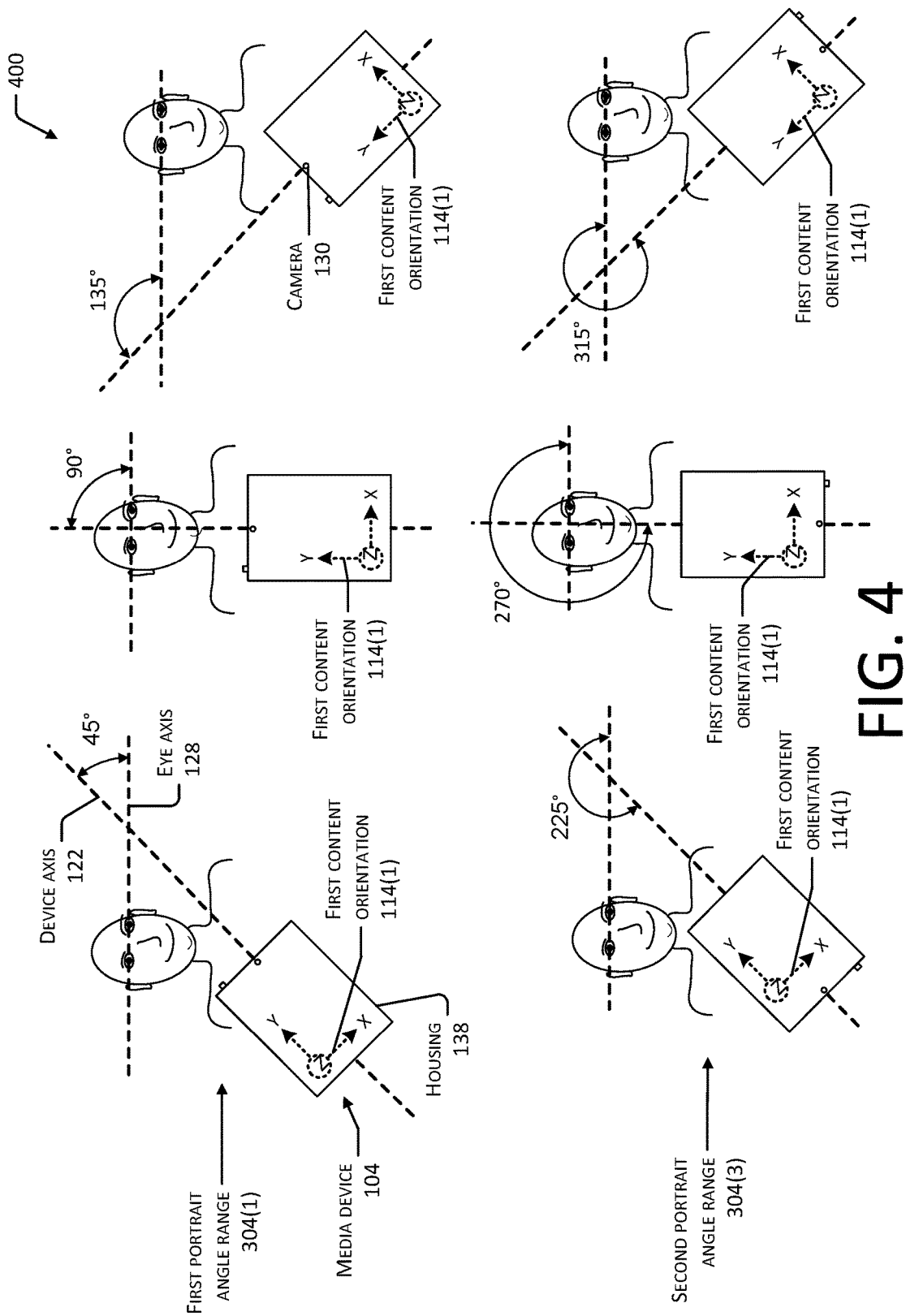
FIG. 4 is a schematic of angles between the eye axis and the device axis when the content is presented in a portrait orientation.

For example, referring to FIG. 4, a schematic 400 of example angles of the first portrait angle range 304(1) and the second portrait angle range 304(3). As illustrated, where the angle between the device axis 122 and the eye axis 128 is 45°, 90°, 135°, 225°, 270°, and 315°, the media device 104 displays the content 110 in the portrait content orientation or the first content orientation 114(1).

Figure 5:
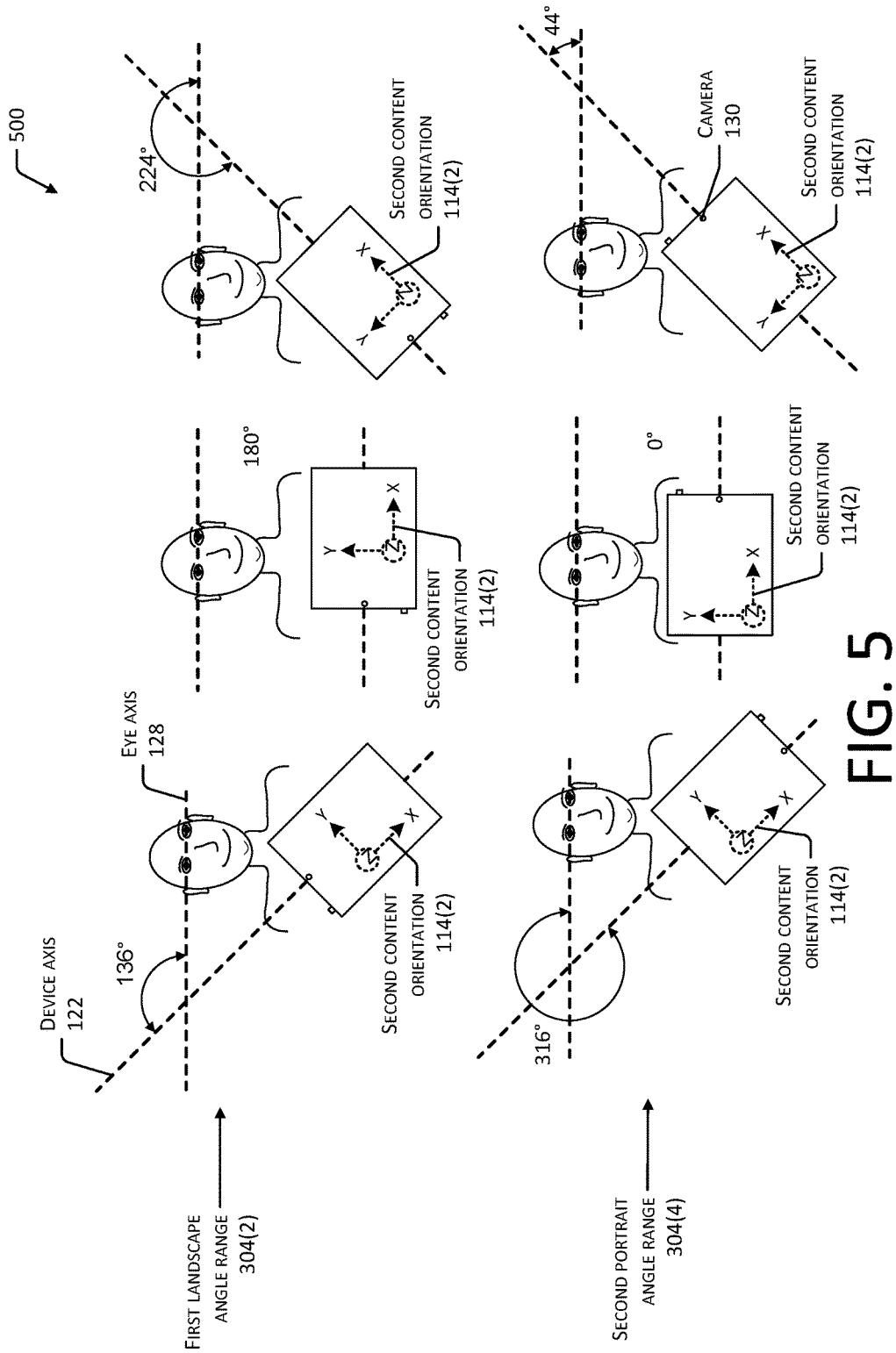
FIG. 5 is a schematic of angles between the eye axis and the device axis when the content is presented in a landscape orientation.

Referring to FIG. 5, a schematic 500 illustrates some example angles of the first landscape angle range 304(2) and the second landscape angle range 304(4). As illustrated, where the angle between the device axis 122 and the eye axis 128 is 136°, 180°, 224°, 316°, 0°, and 44°, the media device 104 displays the content 110 in the landscape content orientation or the second content orientation 114(2).

In some implementations, the orientation angle ranges 304 are adjustable based on the location of the media device 104. For example, the orientation angle ranges 304 may be adjusted based on whether the user 102 is located at work or at home. The orientation angles ranges 304 may be set by the user 102 using an input device. For example, the user 102 may manually adjust the angles which are associated with the content orientations 114. In some implementations, the orientation angle ranges 304 may be adjusted based on historical data.

The angle ranges 304 may be exhibit hysteresis. In one implementation, the angle ranges 304 may be determined based on the direction in which the angle between the device axis 122 and the eye axis 128 changes. For example, in a scenario where the user 102 is standing and then lays down, the content orientation 114 may change sooner than where the user 102 is lying down and then stands up. For example, when the user 102 is standing and then lays down, the content orientation 114 may change when the angle between the device axis 122 and the eye axis 128 is equal to forty-three degrees, but when the user 102 is lying down and then stands up, the content orientation 114 may change when the angle is equal to 48° degrees.

Figure 6:
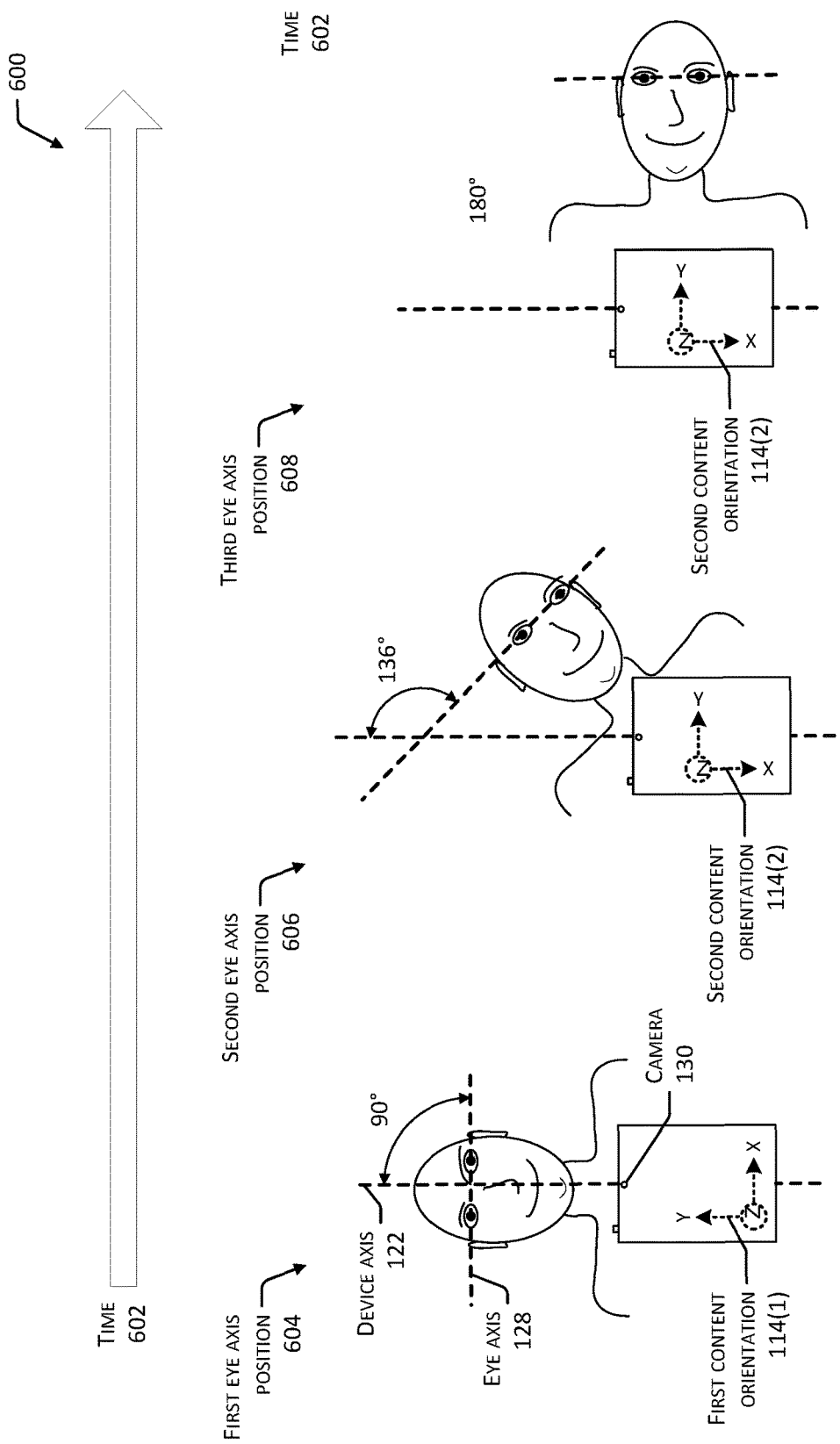
FIG. 6 is a schematic of the media device configured to present content based on the angle between the eye axis and the device axis, illustrating a change in the content orientation when the eye axis changes orientation.

FIG. 6 is a schematic 600 of the media device 104, illustrating a change in the content orientation 114 when the eye axis 128 changes position and orientation. In this illustration, time increases across the page, as indicated by the arrow 602. FIG. 6 may be described as depicting a scenario where the user 102 begins in a standing position and finishes in a lying position. The media device 104 depicted in FIG. 6 remains fixed. In this example, the media device 104 employs the angle library 136 which includes the angle ranges described above.

In a first eye axis position 604, the angle between the device axis 122 and the eye axis 128 is 90°. Because the angle between the device axis 122 and the eye axis 128 is within the first orientation angle range 304(1) (i.e., within 45° to 135°), the media device 104 displays the content 110 in the portrait content orientation or the first content orientation 114(1).

In a second eye axis position 606, the angle between the device axis 122 and the eye axis 128 is 136°. Because the angle between the device axis 122 and the eye axis 128 is within the first landscape angle range 304(2) (i.e., within 136° to 224°), the media device 104 displays the content 110 in the landscape content orientation or the second content orientation 114(2).

Referring to a third eye axis position 608, the angle between the device axis 122 and the eye axis 128 is 180°. Because the angle between the device axis 122 and the eye axis 128 is still within the first landscape angle range 304(2), the media device 104 continues to display the content 110 in the landscape content orientation or the second content orientation 114(2).

Figure 7:
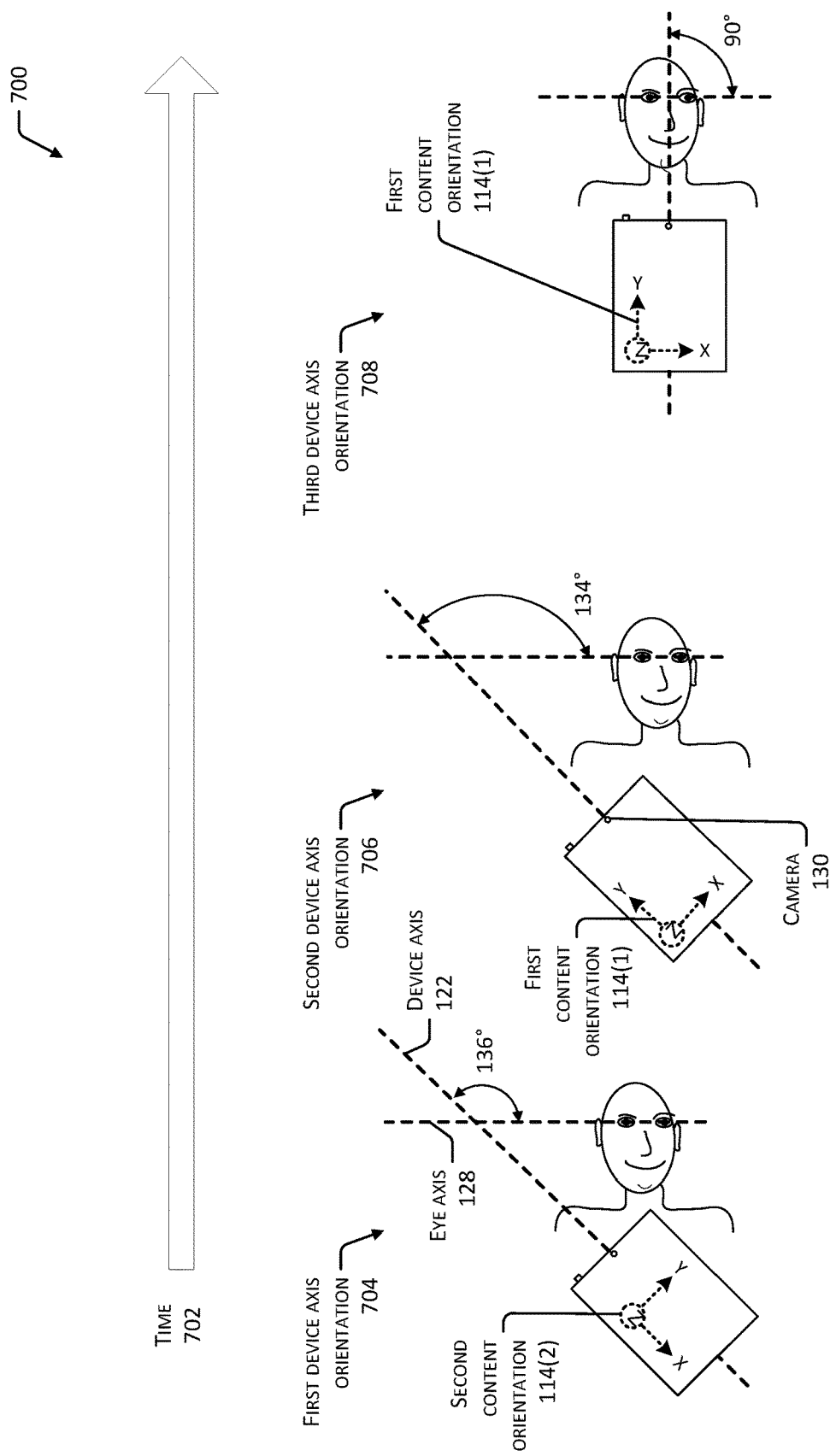
FIG. 7 is a schematic of the media device configured to present content based on the angle between the eye axis and the device axis, illustrating a change in the content orientation when the device axis changes orientation.

FIG. 7 is a schematic 700 of the media device 104, illustrating a change in the content orientation 114 when the device axis 122 changes orientation. In this illustration, time increases across the page, as indicated by the arrow 702. FIG. 7 illustrates a scenario where the user 102 changes the orientation of the media device 104 while the user 102 remains in a fixed position. In this implementation, the media device 104 detects a user movement of the user 102 with a movement sensor discussed in more detail below with respect to FIG. 8. In this example, the media device 104 employs the angle library 136 which includes the angle ranges described above.

In a first device eye axis orientation 704, the angle between the device axis 122 and the eye axis 128 is 136°. Because the angle between the device axis 122 and the eye axis 128 is within the first landscape angle range 304(2), the media device 104 displays the content 110 in the landscape content orientation or the second content orientation 114(2).

In a second device axis orientation 706, the angle between the device axis 122 and the eye axis 128 is 134°. Because the angle between the device axis 122 and the eye axis 128 is within the first portrait angle range 304(1), the media device 104 rotates the content 110 by 90° from the second content orientation 114(2) to the portrait content orientation or the first content orientation 114(1).

Referring to a third device axis orientation 708, the angle between the device axis 122 and the eye axis 128 is 90°. Because the angle between the device axis 122 and the eye axis 128 is still within the first portrait angle range 304(1), the media device 104 continues to display the content 110 in the portrait content orientation or the first content orientation 114(1).

Figure 8:
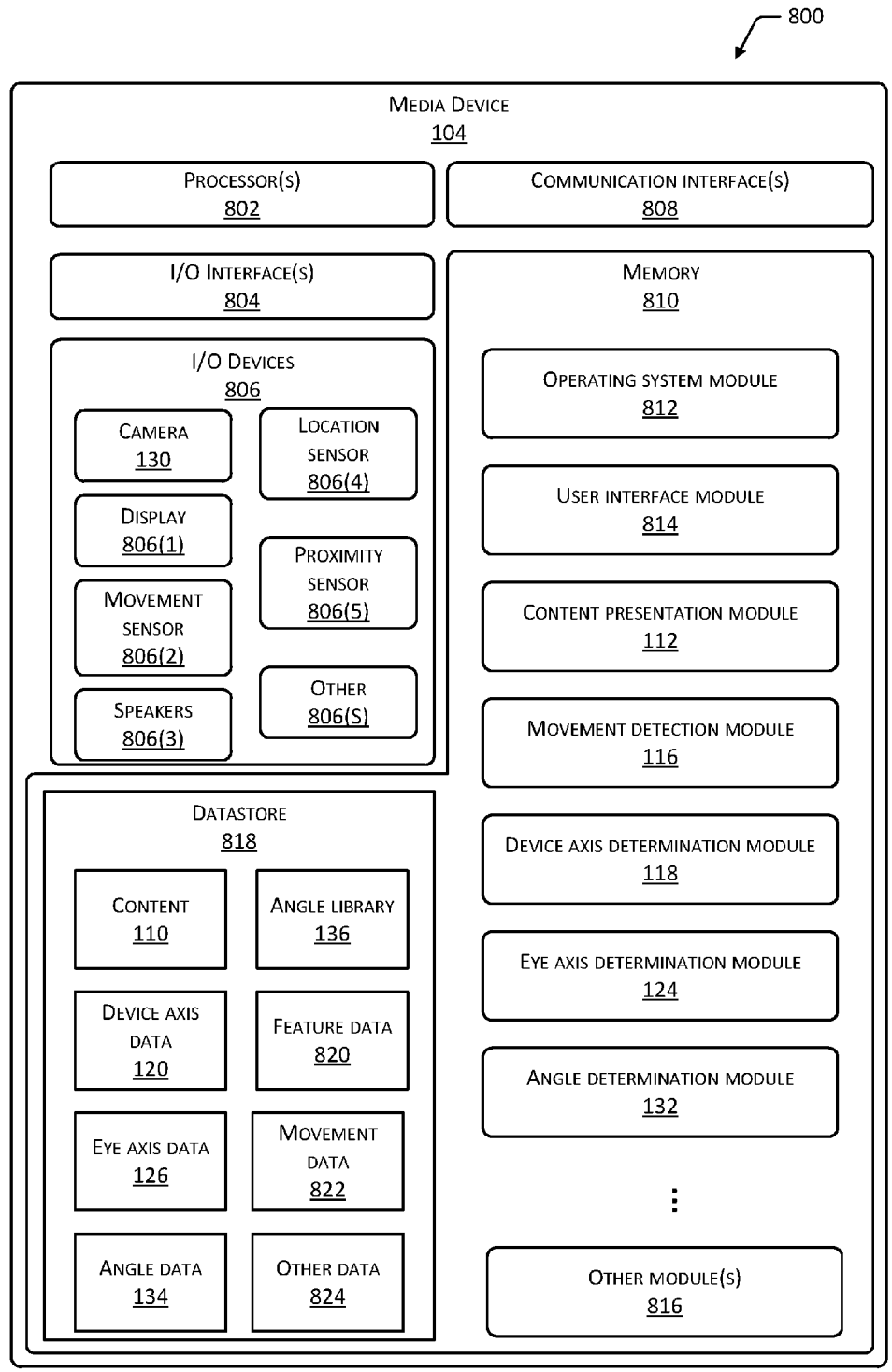
FIG. 8 is a block diagram of the media device configured to present content based on the angle between the eye axis and the device axis.

FIG. 8 is a block diagram 800 of the media device 104 configured to present content based on the angle between the device axis 122 and the eye axis 128. The media device 104 may include at least one processor 802 configured to execute stored instructions. The at least one processor 802 may comprise one or more cores.

The media device 104 includes at least one input/output ("I/O") interface 804 which enables portions of the media device 104 (e.g., the processor 802) to communicate with other devices. The I/O interface 804 may include inter-integrated circuit ("I2C"), serial peripheral interface bus ("SPI"), USB, RS-232, HDMI, TOSLINK, Bluetooth, and so forth. The at least one I/O interface 804 may be coupled to at least one I/O device 806. In some implementations, certain I/O devices 806 are physically incorporated with the media device 104 or externally placed.

As illustrated in FIG. 8, the at least one I/O device 806 may include the camera 130, a display device 806(1), a movement sensor 806(2), speakers 806(3), a location sensor 806(4), a proximity sensor 806(5), and other I/O devices 806(S).

The camera 130 may be configured to acquire image data (e.g., photographs), video data, or a combination thereof. The camera 130 may include any device configured to acquire image data.

The display device 806(1) may include an electrophoretic display, a liquid crystal display, an interferometric display, a cholesteric display, a light emitting diode display, a projection display, and so forth. The display device 806(1) includes a display screen where the content 110 is displayed.

The movement sensor 806(2) may include at least one of an accelerometer(s), a tilt sensor(s), a gyroscope(s), and so forth. The movement sensor 806(2) may be configured to generate movement data indicating at least one of a device movement of the media device 104 or a user movement of the user 102 associated with the media device 104. The tilt sensor(s) may include one or more TrueTILT™ Narrow Angle Precision Leveling Sensors from The Fredericks Company of Huntingdon Valley, Pa. or Parallax 4-Directional Tilt Sensors from Parallax, Inc. of Rocklin, Calif.

The speakers 806(3) may be used in a sound system of the media device 104 which may include a stereo sound system, a Left/Center/Right ("LCR") sound system, or a surround sound system. The speakers 806(3) may be disposed in different positions in the media device 104. For example, the media device 104 may include: a left speaker on a left side of the media device 104; a right speaker on a right side of the media device 104; a top speaker on a top of the media device 104; and a bottom speaker on a bottom of the media device 104.

The location sensor 806(4) may be configured to generate location data. The location data may include geolocation data which is indicative of a latitude and longitude of the media device 104. The location sensor 806(4) may also determine the location of the media device 104 using an inertial navigation system, dead-reckoning navigation system, network positioning system, radio position finding system, satellite-based navigation system, an accelerometer system, a gyroscope system, and so forth. The satellite-based system may include one or more of a Global Positioning System receiver, a Global Navigation Satellite System (GLONASS) receiver, a Galileo receiver, an Indian Regional Navigational Satellite System, and so forth.

The one or more proximity sensors 806(5) may be configured to generate data indicative of a presence of an object proximate to the device. For example, the proximity sensors 806(5) may detect a table, the user's 102 hand, and so forth. The proximity sensors 806(5) may include optical proximity sensors, capacitive proximity sensors, acoustic proximity sensors, near field communication ("NFC") tag readers, radio frequency identification ("RFID") tag readers, and so forth.

The other I/O device 806(S) may include components such as one or more buttons, one or more touch sensors and one or more haptic output devices.

The media device 104 may include at least one communication interface 808. The communication interface 808 may be configured to provide communications between the media device 104 and other devices, such as servers, routers, access points and so forth. The communication interface 808 may connect to a network.

The media device 104 may include at least one bus or other internal communications hardware or software that enables for the transfer of data between the various modules and components of the media device 104.

As illustrated in FIG. 8, the media device 104 may include at least one memory or memory device 810. The memory 810 may include at least one computer-readable storage media ("CRSM"). The CRSM may include at least one of an electronic storage medium, a magnetic storage medium, an optical storage medium, a quantum storage medium, a mechanical computer storage medium, and so forth. The memory 810 may include computer readable instructions, data structures, program modules and other data for the operation of the media device 104.

The memory 810 may include at least one operating system ("OS") module 812. The OS module 812 may be configured to manage hardware resources such the I/O interface 804, the I/O device 806, the communication interface 808, and provide various services to applications or modules executing on the processor 802. The memory 810 may also store at least one of the following modules which may be executed as foreground applications, background tasks, daemons, and so forth.

The memory 810 may include a user interface module 814 configured to provide a user interface to the user 102 using the I/O devices 806 and to accept inputs received from the I/O devices 806. The user interface may include one or more visual, audible, or haptic elements. For example, the user interface may be configured to provide a graphic user interface, an audible user interface, and so forth.

As described above, the content presentation module 112 is configured to present the content 110 using output devices such as the display 806(1) and the speakers 806(3). The content presentation module 112 is configured to present the content 110 in the content orientation 114. The content presentation module 112 may determine the content orientation 114 by comparing the angle between the device axis 122 and the eye axis 128 with the angle library 136. The content presentation module 112 may present the content 110 based on which orientation angle range the angle between the device axis 122 and the eye axis 128 is within. In some implementations, the content presentation module 112 is configured to operate with the display device of the media device 104 such that the display device simultaneously presents first content 110(1) for a first user 102(1) and second content 110(2) for a second user 102(2) with different orientations. In one implementation, the display device of the media device 104 may be configured to display the content 110(1) and 110(2) in different windows or in a split screen orientation. For example, the content 110(1) displayed for a first user 102(1) may have a different content orientation 114 than content 110(2) displayed for a second user 102(2), with each oriented with respect to the particular user 102.

As discussed above, the movement detection module 116 may be configured to detect a movement of the media device 104. The detection of the movement may be detected using the movement sensor 806(2), the proximity sensor 806(5), or both. The movement sensor 806(2) may include an accelerometer(s), a gyroscope(s), or a combination thereof. The proximity sensor 806(5) may include an optical proximity sensor, capacitive proximity sensor, NFC reader, and so forth. The detection of the movement of the media device 104 may be based on a change in the position of the media device 104, based on a change in the orientation of the media device 104, detection of a proximate object, or a combination thereof.

As described above, the device axis determination module 118 may be configured to generate the device axis data 120 representative of the device axis 122. The generation of the device axis data 120 may be generated using an accelerometer(s), a gyroscope(s), or a combination thereof. The accelerometer(s) and gyroscope(s) may be used to determine the orientation of the media device 104.

As described above, the eye axis determination module 124 may be configured to generate the eye axis data 126 representative of the eye axis 128. To generate the eye axis data 126, the eye axis determination module 124 may use the camera 130 to acquire feature data. The feature data is discussed in more detail below. The determination of the eye axis data 126 may be based on data representative of the user's 102 eyes. In some implementations, the determination of the eye axis data 126 may be based on other features of the user 102, for example, the user's 102 mouth, ears, nose, shoulders of the user, a hat worn by the user, facial hair of the user, jewelry worn by the user, or glasses worn by the user, and so forth.

In some implementations, the image data includes data representative of a plurality of sets of eyes of a plurality of users 102. For example, more than one user 102 may be positioned in front of the camera 130 when the camera captures the image data used to determine the eye axis 128. In another example, the image data may include the user 102 and other people in the background. The eye axis determination module 124 may be configured to determine the eye axis 128 based on the set of eyes which are determined to be closer to the media device 104. For example, a depth camera or more than one camera 130 may be employed to determine which set of eyes are closer to the media device 104. In some implementations, the eye axis determination module 124 may be configured to determine the eye axis 128 based on the size of the data representative of the users' 102 eyes, or the separation distance between the eyes. For example, the eye axis determination module 124 may be configured to determine the eye axis 128 based on the largest eyes which have the greatest separation which may be considered indicative of the eyes which are closest to the camera. In some implementations, where multiple sets of eyes are detected in the image data, the eye axis determination module 124 may not be configured to determine which set of eyes should be used to determine the content orientation 114. In these implementations, the content presentation module 112 may be configured to present the content 110 in a default orientation.

As described above, the angle determination module 132 may be configured to generate the angle data 134 representative of the angle between the device axis 122 and the eye axis 128.

As illustrated in FIG. 8, the media device 104 may include other module(s) 816. For example, the other module 816 may include a location determination module configured to provide location data of the media device 104 based at least in part on information received from the one or more location sensors 806(4). The location data may include data indicative of the location of the media device 104. The location data may include geolocation data which is indicative of the latitude and longitude of the media device, relative position such as "conference hall A", and so forth. In some implementations, the angle between eye axis and device axis 306 defined in the angle library 136 may be adjusted based on the location data. For example, referring to FIG. 3, when the location data indicates the user 102 is at work, for the first portrait angle range 304(1), the media device 104 may adjust the angle between eye axis and device axis 306 from 45°-135° to 20°-160°. The adjustment may occur because it is less likely for the user 102 to desire for the content orientation 114 to rotate while at work. In some implementations, the media device 104 selects which angle range(s) 304 to use based on the location data. In one example, based on the user 102 being located at work, the media device 104 selects the use of only the first portrait angle range 304(1) and the first landscape angle range 304(2).

In some implementations, the memory 810 includes a datastore 818 for storing information. The datastore 818 may use a flat file, database, linked list, tree or other data structure to store the information. In some implementations, the datastore 818, or a portion thereof, may be distributed across at least one other device, such as a server, a network storage device, and so forth. As illustrated in FIG. 8, the datastore 818 may include the content 110, the device axis data 120, the eye axis data 126, the angle data 134, the angle library 136, the feature data 820, the movement data 822, and other data 824.

The content 110 disclosed herein may be stored in its entirety or a portion. For example, the media device 104 may stream content 110 from a server, such that, at any given time, only a portion of the content 110 is stored within the memory 810. The content 110 may include some content 110 which is not configurable to be presented in both the first content orientation 114(1) and the second content orientation 114(2). This content 110 may be described as having a locked orientation.

The device axis data 120 may be representative of the device axis 122 which may be described as being parallel with the longest dimension of the media device 104. The eye axis data 126 may be representative of a line which extends between or through each of the user's 102 pupils. The angle data 134 may be representative of the angle between the device axis 122 and the eye axis 128. As described above, the angle library 136 may associate particular angles with particular content orientations.

The feature data 820 may include data representative of the user's 102 features, for example, the user's 102 eyes, mouth, ears, nose, shoulders of the user, a hat worn by the user, facial hair of the user, jewelry worn by the user, or glasses worn by the user, and so forth. The feature data 820 may include first eye data representative of the user's 102 first eye, and second eye data representative the user's 102 second eye.

The movement data 822 may include data representative of a device movement of the media device 104 or a user movement of a user 102 associated with the media device 104. As described above, in some implementations, the media device 104 is configured to capture image data in response to detecting a device movement of the media device 104 or a user movement of a user 102 associated with the media device 104.

The other data 824 may include data representative of a facial orientation of the user 102. The facial orientation of the user 102 may be determined based on processing image data captured using the camera 130. The facial orientation of the user 102 may be described as a position of the user's 102 face relative to the media device 104. The other data 824 may include data representative of a feature axis of the user 102. The feature axis of the user 102 may be described as extending from a first feature of the user 102 to a second feature of the user 102. For example, the feature axis may extend through each of the user's 102 ears or from chin through nose.

In some implementations, the media device 104 includes a chassis configured to mechanically support at least one of the processor 802, the I/O interfaces 804, the I/O devices 806, the communication interface 808 and the memory 810.

Illustrative Scenarios and Processes

Figure 9:
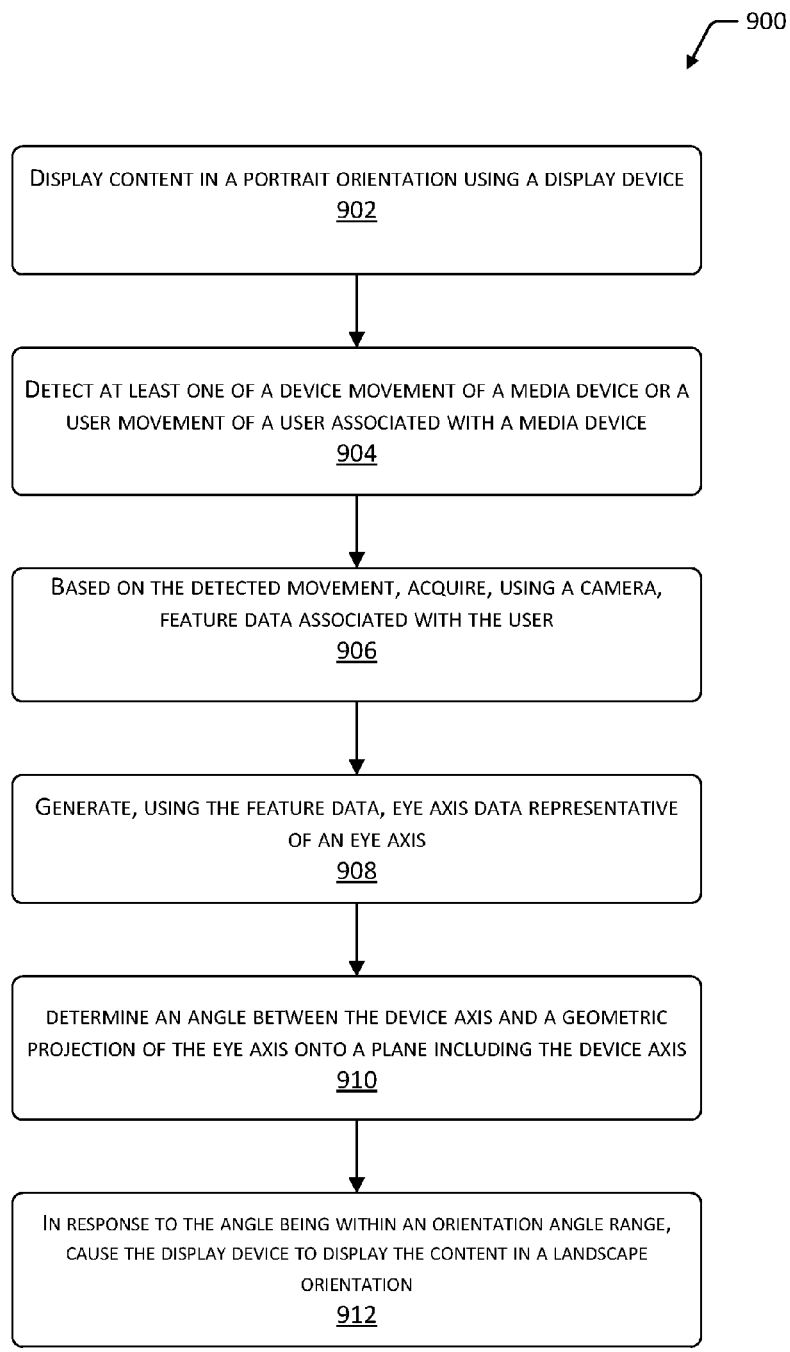
FIG. 9 is a flowchart illustrating a process of displaying content based the angle between the eye axis and the device axis.

FIG. 9 is a flowchart illustrating a process 900 of displaying content based on the angle between the device axis 122 and the eye axis 128. The media device 104 may implement the process 900. Although the process 900 is described with reference to the flowchart illustrated in FIG. 9, many other methods performing the acts associated with the process 900 may be used. For example, the order of the steps may be changed, some of the steps described may be optional, and additional steps may be included.

At block 902, the media device 104 displays the content 110 in the portrait orientation 114(1) using the display device 806(1). In one example, the processor 802 sends, to the display device 806(1), the content 110 in the portrait orientation.

At block 904, the media device 104 detects at least one of a device movement of the media device 104 or a user movement of a user 102 associated with the media device 104. In one example, the processor 802 may receive, from the movement sensor 806(2), the proximity sensor 806(5), or both, the movement data 822 which indicates the device movement of the media device 104 or the user movement of the user 102 associated with the media device 104. As described above, the movement sensor 806(2) may include at least one of an accelerometer, a gyroscope, a tilt sensor, or a combination thereof. The proximity sensors 806(5) may include optical proximity sensors, capacitive proximity sensors, acoustic proximity sensors, NFC tag readers, RFID tag readers, and so forth.

The device movement may be detected based on whether the device movement exceeds a predetermined magnitude or amount of movement. For example, a slight movement of the media device 104 may not cause the detection of the movement of the media device 104.

At block 906, based on the detected movement, the media device 104 acquires, using the camera 130, feature data 820 associated with the user 102. In one example, in response to receiving the movement data 822, the processor 802 acquires or generates, using the camera 130, the feature data 820 associated with the user 102. In another example, in response to receiving the movement data 822, the processor 802 acquires, using the camera 130, image data of the user 102. The image data may include the feature data 820 which is representative of the user's 102 features. The features may include the user's 102 eyes, mouth, nose, shoulders of the user, a hat worn by the user, facial hair of the user, jewelry worn by the user, glasses worn by the user, and so forth. In one example, the feature data 820 includes eye data representative of a position within a two-dimensional image of a first eye of the user 102 and a second eye of the user 102 as captured by the camera 130.

In some implementations, the media device 104 acquires the feature data 820 based on whether a threshold magnitude of movement has occurred. For example, in response to receiving the movement data 822, the media device 104 may determine a movement value indicative of a magnitude of movement associated with the device movement of the media device 104 or the user movement of the user 102 associated with the media device 104.

At block 908, the media device 104 generates, using the feature data 820, the eye axis data 126 representative of the eye axis 128. Continuing the example, using the feature data acquired using the camera 130, the processor 802 generates the eye axis data 126 by extending a line through each of the user's 102 eyes in the feature data 820.

At block 910, the media device 104 determines an angle between the eye axis 128 and a device axis 122 of the media device 104. The device axis 122 may be described as a line which extends parallel to the height of the housing 138 of the media device 104.

Figure 10:
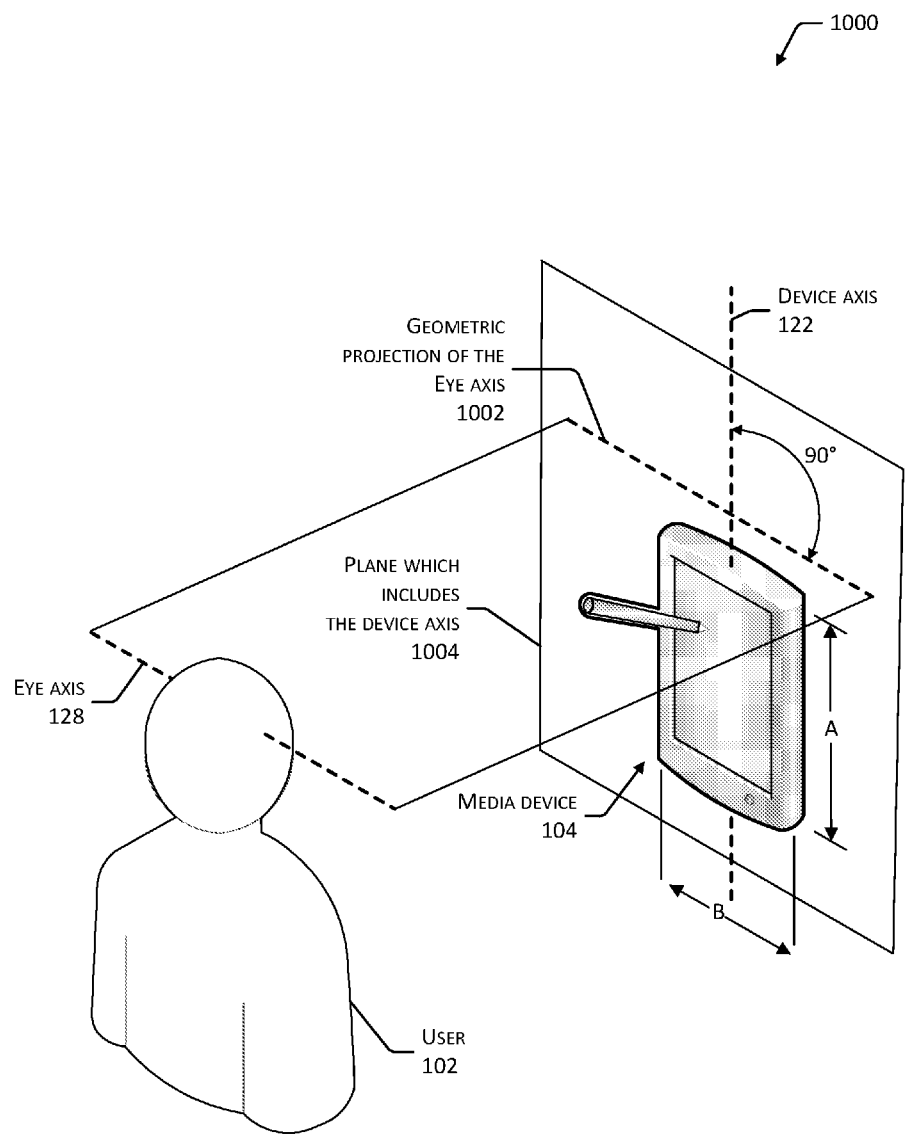
FIG. 10 is a schematic of a plane of the media device which includes the device axis and a geometric projection of the eye axis onto the plane.
Figure 10:
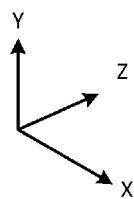

As illustrated in FIG. 10, in some implementations, the media device 104 determines the angle between the device axis 122 and the eye axis 128 by determining the angle between the device axis 122 and a geometric projection 1002 of the eye axis 128 onto a plane 1004 which includes the device axis 122. The media device 104 depicted in FIG. 10 includes dimension A which extends along a longest edge of the media device 104 (such as height), and dimension B which extends along a second longest edge of the media device 104 (such as width). In this example, the plane 1004 is a flat, two-dimensional surface which extends in the depicted dimension A and dimension B. As illustrated, the plane 1004 includes the device axis 122. In this example, the angle between the device axis 122 and the geometric projection 1002 of the eye axis 128 onto the plane 1004 which includes the device axis 122 is 90°.

Referring back to FIG. 9, at block 912, in response to the angle being within an orientation angle range, the media device 104 displays the content 110 in the landscape orientation 114(2). In one example, in response to the angle being within 0° to 44°, 136° to 224°, or 316° to 360°, the processor 802 causes the display device 806(1) to display the content 110 in the landscape content orientation 114(2). In some implementations, in response to the device axis 122 being parallel to the geometric projection of the eye axis 128 onto the plane 1002 of the device axis 122, the media device 104 displays the content 110 in the landscape content orientation 114(2).

Figure 11:
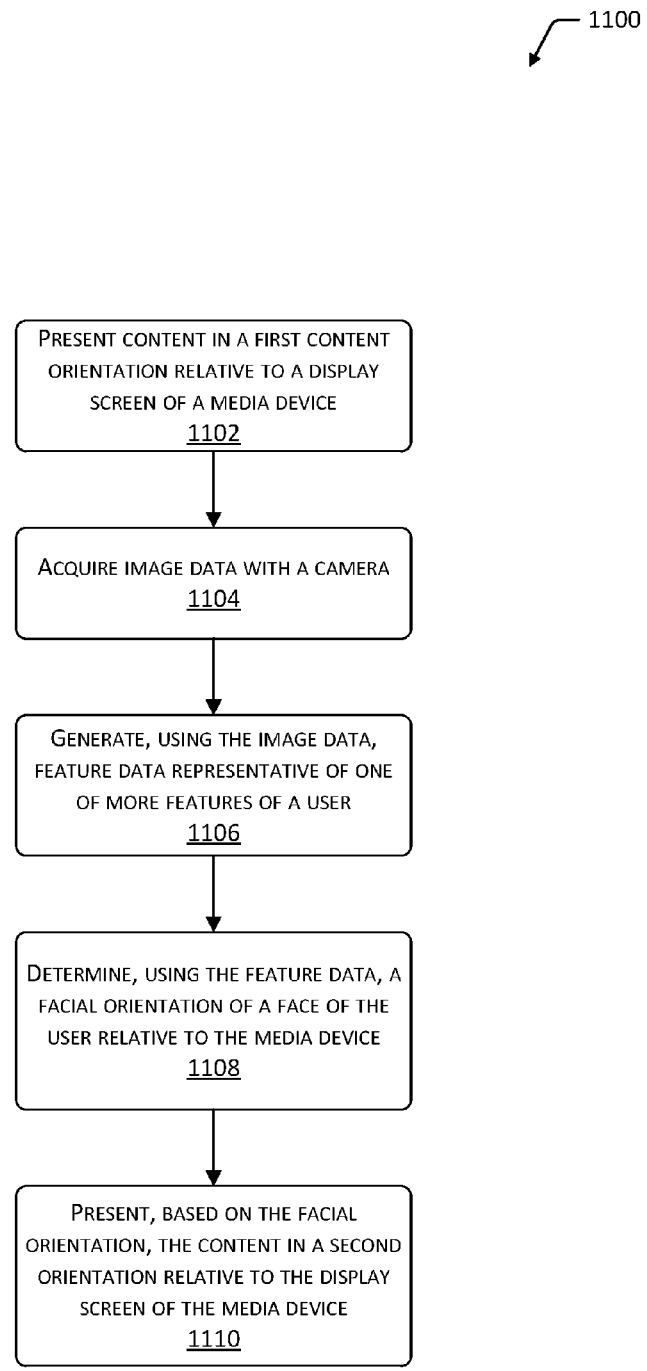
FIG. 11 is a flowchart illustrating a process of presenting content in a second orientation based on a facial orientation.

FIG. 11 is a flowchart illustrating a process 1100 of presenting the content 110 in the first orientation 114(1), and subsequently presenting the content 110 in the second orientation 114(2) based on generated feature data representative of the user's 102 features. The media device 104 may implement the process 1100. Although the process 1100 is described with reference to the flowchart illustrated in FIG. 11, many other methods performing the acts associated with the process 1100 may be used. For example, the order of the steps may be changed, some of the steps described may be optional, and additional steps may be included.

At block 1102, the media device 104 presents the content 110 in the first content orientation 114(1) relative to the display screen of the media device 104. For example, the media device 104 may display the content 110 in the portrait orientation 114(1).

At block 1104, the media device 104 acquires image data using the camera 130. At block 1106, the media device 104 generates, using the image data, the feature data 820 which is representative of one or more features of the user 102. As described above, the features may include the user's 102 eyes, mouth, nose, shoulders of the user, a hat worn by the user, facial hair of the user, jewelry worn by the user, glasses worn by the user, and so forth. In some implementations, the camera 130 may be configured to capture image data at predetermined time intervals. For example, the camera 130 may be configured to capture image data every ten seconds.

At block 1108, the media device 104 determines, using the feature data 820, the facial orientation of a face of the user 102 relative to the media device 104. The facial orientation of the user 102 may be described as a position of the face of the user 102 relative to the media device 104. The facial orientation of the user 102 may be determined based on processing the image data captured using the camera 130.

At block 1110, based on the facial orientation of the face of the user 102, the media device 104 presents the content 110 in the second content orientation 114(2) relative to the display screen of the media device 104. For example, the media device 104 may rotate the content 110 ninety degrees from the first content orientation 114(1) to the second content orientation 114(2) because the angle between an axis of the facial orientation of the user 102 and the device axis 122 is within an orientation angle range associated with the second content orientation 114(2). In other examples, the media device 104 may rotate the content 110 any number of degrees from the first content orientation 114(1). For example, the media device may be configured to present the content 110 such that the content orientation 114 tracks the user's 102 orientation. In some implementations, the media device 104 determines the content orientation 114 of the content 110 each time the media device 104 is powered on. In some implementations, the content 110 may be configured to track the facial orientation of the user 102. In these implementations, the media device 104 may continuously acquire the feature data 820 associated with the user 102 with the camera 130. With the continuously acquired feature data 820, the media device 104 may continuously generate the eye axis data 126 representative of the eye axis 128. With this continuously generated eye axis data 126, the media device 104 may continuously determine the angle between the device axis 122 and the eye axis 128, and the therefore present the content 110 based on the angle.

In some implementations, the media device 104 includes a stereo sound system which includes at least two speakers 806(3) configured to produce stereophonic sound. The at least two speakers 806(3) may have a first configuration in which a left speaker presents left audio data, and a right speaker presents right audio data. In these implementations, in response to a determination to present the content 110 in the second orientation 114(2), the media device 104 may be configured to change the configuration from the first configuration to a second configuration in which the left speaker presents the right audio data and the right speaker presents the left audio data. In one example, the media device 104 presents the sound in the first configuration when the angle between the eye axis and the device axis is between 45° and 135°, and presents the sound in the second configuration when the angle between eye axis and the device axis is between 225° and 315°.

In some implementations, the media device 104 includes a sound system configured to use more than two speakers. For example, the media device 104 may include a Left/Center/Right ("LCR") sound system, a surround sound system, or, as discussed above, a stereo sound system. In one example, the plurality of speakers 806(3) include at least the following four speakers: a left speaker on a left side of the media device 104; a right speaker on a right side of the media device 104; a top speaker on a top of the media device 104; and a bottom speaker on a bottom of the media device 104. In this example, when the media device 104 presents the content 110 having the first content orientation 114(1), the left speaker provides first audio output data, the right speaker provides second audio output data, the top speaker provides third audio output data, and the bottom speaker provides fourth audio output data. In this example, when the media device 104 presents the content 110 in the second content orientation 114(2), the media device 104 may switch or rotate each of the audio output data such that the left speaker provides the fourth audio output data, the right speaker provides the third audio output data, the top speaker provides the first audio output data, and the bottom speaker provides the second audio output data. In this way, the intended stereophonic output is provided to the user 102.

Figure 12:
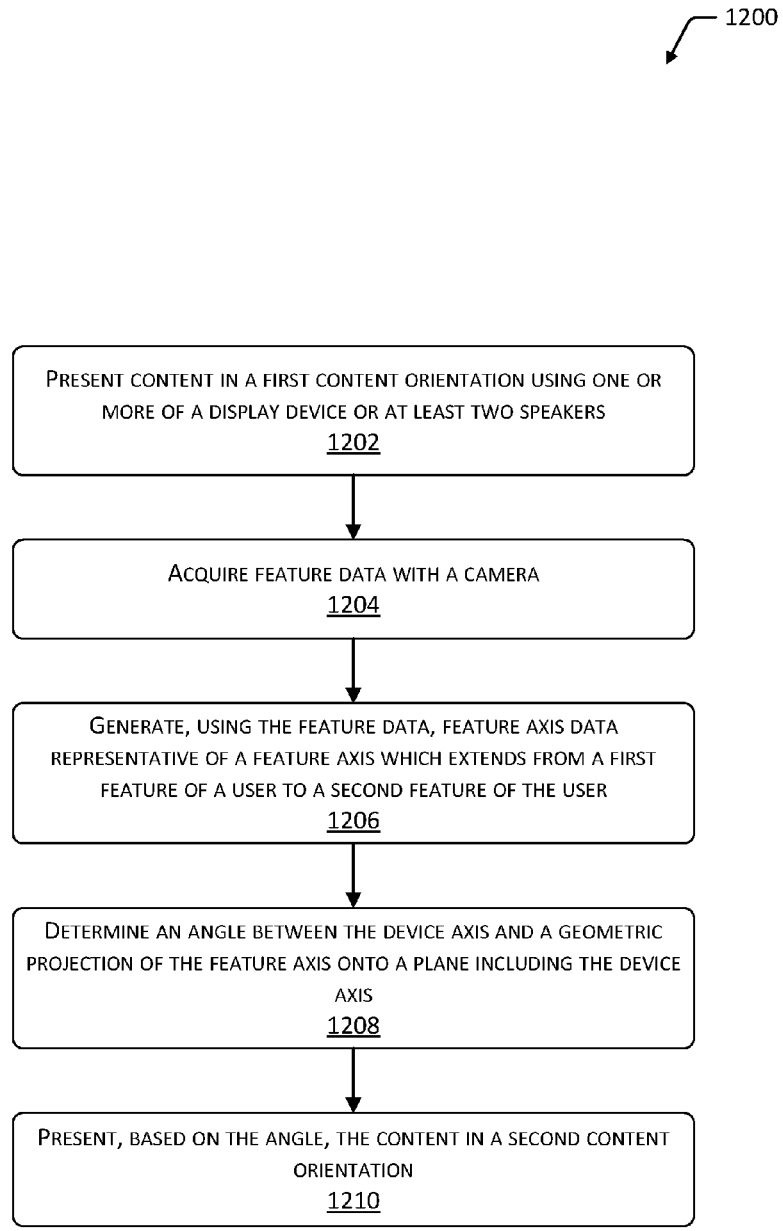
FIG. 12 is a flowchart illustrating a process of presenting content in a first orientation or a second orientation based on the angle between the device axis and the feature axis.

FIG. 12 is a flowchart illustrating a process 1200 of presenting the content 110 in the first content orientation 114(1) or the second content orientation 114(2) based on the angle between the device axis 122 and feature axis of the user 102. The media device 104 may implement the process 1200. Although the process 1200 is described with reference to the flowchart illustrated in FIG. 12, many other methods performing the acts associated with the process 1200 may be used. For example, the order of the steps may be changed, some of the steps described may be optional, and additional steps may be included.

At block 1202, the media device 104 presents the content 110 in the first content orientation 114(1) using one or more of a display device 806(1) or at least two speakers 806(3). For example, the processor 802 may cause at least one of the display device 806(1) or at least two speakers to present the content in the first content orientation 114(1).

At block 1204, the media device 104 acquires the feature data 820 using the camera 130. For example, using the camera 130, the processor 802 may acquire the feature data 820. As discussed above, the feature data 820 which may include data representative of the user's 102 eyes, mouth, and ears, shoulders of the user, a hat worn by the user, facial hair of the user, jewelry worn by the user, or glasses worn by the user.

At block 1206, based on the feature data 820, the media device 104 generates the feature axis data representative of the feature axis which extends from a first feature of the user 102 to a second feature of the user 102. As described above, the feature axis of the user 102 may be described as a line which extends through a first feature associated with the user 102 and a second feature associated with the user 102. For example, the feature axis may extend through each of the user's 102 ears. The feature axis may include the eye axis 128. In other implementations, the feature axis may extend along lines from nose to mouth, from chin to top of head, from one shoulder to another shoulder, from one earring to another earring, and so forth.

At block 1208, the media device 104 determines an angle between the feature axis and the device axis 122. In one example, the processor 802 determines the angle between the device axis 122 and the geometric projection of the feature axis of the user 102 onto the plane 1002 of the device axis 122.

At block 1210, based on the angle between the feature axis and the device axis 122, the media device 104 presents the content 110 in the second content orientation 114(2). For example, the processor 802 may send, to the display device 806(1), the content 110 in the landscape orientation 114(2). The media device 104 may present the content 110 in the second content orientation 114(2) in response to the eye axis 128 forming a designated angle relative to the device axis of the media device 104. The designated angle may include an angle within an angle range such as any of the angle ranges discussed above.

In some implementations, the media device 104 is configured to include a soft content orientation lock mode. When in the soft content orientation lock mode, the media device 104 is configured to rotate the content orientation 114 only when the media device is certain that the content orientation 114 is not proper. For example, when the angle between the device axis 122 and the eye axis 128 is at or near 45°, it may not be clear whether the user 102 desires for the content 110 to be displayed in the portrait content orientation 114(1) or the landscape content orientation 114(2). When the media device 104 is in the soft content orientation lock mode, the media device 104 may be prevented from rotating the content 110 until the angle between the device axis 122 and the eye axis 128 is within a certain predetermined angle range. Continuing with the example, it may be fairly certain that when the angle between the device axis 122 and the eye axis 128 is at or near 90°, the proper content orientation 114 is the portrait orientation 114(1). Accordingly, when the media device 104 is in the soft content orientation lock mode, the media device 104 may rotate the content 110 to a different orientation when the angle between the device axis 122 and the eye axis 128 is equal to an angle within a predetermined angle range.

In some implementations, the media device 104 determines the content orientation 114 based on image data generated at separate points in time. For example, at a first point in time, the media device 104 may generate first eye axis data 126(1) using the camera 130. At a second point in time, the media device 104 may generate second eye axis data 126(2) using the camera 130. In this example, the media device 104 may determine whether displayed content 110 should be rotated by comparing the first eye axis data 126(1) and the second eye axis data 126(2). For example, the comparison of the first eye axis data 126(1) and the second eye axis data 126(2) may indicate that the user 102 has changed his orientation, for example, by moving from a standing position to a lying down position while the media device 104 remains in a fixed spatial orientation 202.

The image data generated at separate points in time may be acquired based on predetermined intervals. For example, the camera 130 may be configured to acquire image data once every fifteen seconds.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A media device comprising:
    a housing having a device axis;
    a processor;
    an input device;
    a display device;
    a device to acquire image data; and
    a memory storing instructions, which when executed by the processor, cause the processor to:
        acquire image data using the device to acquire image data;
        receive, using the input device, data indicative of a first orientation angle range;
        determine an angle, between the device axis and an axis of two or more features of a user depicted in the image data, is within the first orientation angle range; and
        present content on the display device with a specified content orientation associated with the first orientation angle range.

2. The media device of claim 1, wherein the image data depicts a first eye and a second eye of the user, and further wherein the two or more features comprise the first eye and the second eye, and the axis of the two or more features extends in a line from the first eye to the second eye.

3. The media device of claim 1, further comprising one or more sensors;
    receiving movement data from the one or more sensors, the movement data indicative of one or more of movement of the media device, or the user; and
    wherein the instructions, when executed by the processor, cause the processor to:
        determine a movement value indicative of a magnitude of movement associated with the media device;
        determine the movement value is at least equal to or greater than a threshold value; and
        acquire the image data.

4. The media device of claim 1, further comprising a location sensor coupled to the processor, the location sensor configured to generate location data, wherein the first orientation angle range is determined using the location data.

5. A method comprising:
    presenting content in a first content orientation relative to a housing of a media device;
    acquiring image data, the image data representing a set of features of a user;
    determining a feature axis based on the set of features;
    receiving data indicative of a first orientation angle range;
    determining an angle between a device axis and the feature axis is within the first orientation angle range; and
    presenting the content in a second content orientation relative to the housing of the media device.

6. The method of claim 5, further comprising:
    receiving the data indicative of the first orientation angle range using an input device.

7. The method of claim 5, wherein:
    presenting the content having the first content orientation relative to the housing of the media device includes providing, based on the first content orientation, first audio output using a first speaker on a first side of the media device and second audio output using a second speaker on a second side of the media device opposite the first side, the first audio output being stereophonically related to the second audio output; and
    presenting the content in the second content orientation relative to the housing of the display device includes switching, based on the second content orientation, the first audio output and the second audio output such that the first speaker provides the second audio output and the second speaker provides the first audio output.

8. The method of claim 5, wherein:
    presenting the content having the first content orientation relative to the housing of the media device includes providing:

using a left speaker on a left side of the media device, first audio output data;
using a right speaker on a right side of the media device, second audio output data;
using a top speaker on a top of the media device, third audio output data; and
using a bottom speaker on a bottom of the media device, fourth audio output data; and
presenting the content in the second content orientation relative to the housing of the display device includes switching, based on the second content orientation, each of the audio output data such that:
the left speaker provides the fourth audio output data;
the right speaker provides the third audio output data;
the top speaker provides the first audio output data; and
the bottom speaker provides the second audio output data.

9. The method of claim 5, further comprising:
determining, using a sensor, at least one of a device movement of the media device or a user movement of the user, wherein the sensor comprises one or more of an accelerometer, a gyroscope, a tilt sensor, or a proximity sensor; and
determining the feature axis.

10. The method of claim 5, wherein presenting the content having the second content orientation includes displaying the content at ninety degrees, one hundred eighty degrees, or two hundred seventy degrees relative to the first content orientation.

11. The method of claim 5, wherein determining the feature access includes determining an eye axis of the user, the eye axis extending between a first pupil of the user and a second pupil of the user.

12. The method of claim 5, wherein the set of features of the user include one or more of: a nose, a mouth, ears, a hat worn by the user, glasses worn by the user, or jewelry worn by the user.

13. The method of claim 5, wherein the content comprises audio data and the presenting uses a plurality of speakers.

14. The method of claim 5, wherein the content comprises video data and the presenting uses a display device.

15. A media device comprising:
a housing;
a processor;
one or more output devices;
a first device to acquire image data;
an input device; and
a memory, the memory storing instructions, which when executed by the processor, cause the processor to:
acquire feature data using the first device;
generate, using the feature data, feature axis data representative of a feature axis associated with one or more features of a user;
receive, using the input device, data associated with a first orientation angle range;
determine an angle between the housing and the feature axis is within the first orientation angle range; and
present content in a first content orientation.

16. The media device of claim 15, wherein the instructions, when executed by the processor, cause the processor to:
receive, using the input device, data associated with a second orientation angle range;
determine the angle is within the second orientation angle range; and
present the content using the one or more output devices in a second content orientation.

17. The media device of claim 15, further comprising a location sensor coupled to the processor, the location sensor configured to generate location data, wherein the first orientation angle range is determined using the location data.

18. The media device of claim 15, wherein the instructions, when executed by the processor, cause the processor to:
compare the feature data acquired at two or more times;
based on the comparison, detect at least one of device movement of the media device or user movement of the user associated with the media device; and
further wherein the presentation of the content in the first content orientation is also associated with the detection of one or more of the device movement or the user movement.

19. The media device of claim 15, further comprising one or more of an accelerometer, a gyroscope, a tilt sensor, or a proximity sensor; and
wherein the instructions, when executed by the processor, cause the processor to:
determine at least one of a device movement of the media device or a user movement of the user; and
generating the feature axis based on the feature data being associated with the at least one of the device movement of the media device or the user movement of the user.

20. The media device of claim 15, wherein the content presentation in the first content orientation comprises presentation of an image on a display device with a particular orientation with respect to the housing and the content presentation further includes audio output from a first speaker and a second speaker to produce an orientation of stereophonic output with respect to the housing.

* * * * *